(12) United States Patent
Binzer et al.

(10) Patent No.: US 8,441,397 B2
(45) Date of Patent: May 14, 2013

(54) MONOSTATIC MULTIBEAM RADAR SENSOR DEVICE FOR A MOTOR VEHICLE

(75) Inventors: Thomas Binzer, Stuttgart (DE); Joachim Hauk, Renningen-Malmsheim (DE); Elisabeth Hauk, legal representative, Renningen-Malmsheim (DE); Rahel Hauk, legal representative, Renningen-Malmsheim (DE); Manuel Hauk, legal representative, Renningen-Malmsheim (DE); Dirk Steinbuch, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 12/812,528

(22) PCT Filed: Dec. 18, 2008

(86) PCT No.: PCT/EP2008/067901
§ 371 (c)(1),
(2), (4) Date: May 18, 2011

(87) PCT Pub. No.: WO2009/089986
PCT Pub. Date: Jul. 23, 2009

(65) Prior Publication Data
US 2011/0260912 A1    Oct. 27, 2011

(30) Foreign Application Priority Data

Jan. 16, 2008  (DE) .................. 10 2008 004 644

(51) Int. Cl.
*G01S 13/48* (2006.01)
*H01Q 3/12* (2006.01)
(52) U.S. Cl.
USPC ............... 342/175; 342/81; 342/82; 342/374

(58) Field of Classification Search .............. 342/70–72, 342/81–82, 84–88, 100, 157–158, 175, 374
See application file for complete search history.

(56) References Cited

U.S. PATENT DOCUMENTS 5,325,095 A * 6/1994 Vadnais et al. ................. 342/22
5,483,696 A    1/1996 Wheatley, III et al.
(Continued)

FOREIGN PATENT DOCUMENTS

DE   102 39 856    3/2004
DE   10 2004 044 130    3/2006
(Continued)

OTHER PUBLICATIONS

Issakov, V.; Tiebout, M.; Knapp, H.; Yiqun Cao; Simburger, W.; , "Merged power amplifier and mixer circuit topology for radar applications in CMOS," ESSCIRC, 2009. ESSCIRC '09. Proceedings of, vol., no., pp. 300-303, Sep. 14-18, 2009.*
(Continued)

*Primary Examiner* — John B Sotomayor
(74) *Attorney, Agent, or Firm* — Kenyon & Kenyon LLP

(57) ABSTRACT

A monostatic multibeam radar sensor device for a motor vehicle, including a directional characteristic of an antenna unit having at least one transceiving channel and at least one receiving channel, and including a mixer system, which has an at least approximately isolating mixer for at least one of the receiving channels. The at least approximately isolating mixer includes a Gilbert cell mixer, which, due to a non-ideal isolation between an input of the local oscillator signal and the corresponding receiving channel, emits a transmission power via this receiving channel, using an overcoupling signal, the transmission power influencing the directional characteristic of the antenna unit and the directional characteristic being switchable by controlling the phase position of the overcoupling signal.

7 Claims, 3 Drawing Sheets

U.S. PATENT DOCUMENTS

| | | | | |
|---|---|---|---|---|
| 6,054,948 | A * | 4/2000 | Dean | 342/372 |
| 6,236,352 | B1 * | 5/2001 | Walmsley | 342/118 |
| 6,275,688 | B1 | 8/2001 | Takagi et al. | |
| 7,002,511 | B1 * | 2/2006 | Ammar et al. | 342/134 |
| 7,420,503 | B2 * | 9/2008 | Uchino | 342/70 |
| 7,460,055 | B2 * | 12/2008 | Nishijima et al. | 342/70 |
| 7,609,199 | B2 * | 10/2009 | Nishijima et al. | 342/175 |
| 7,898,469 | B2 * | 3/2011 | Ujita et al. | 342/194 |
| 7,982,663 | B2 * | 7/2011 | Miyake et al. | 342/165 |
| 2004/0239555 | A1 * | 12/2004 | Steinbuch et al. | 342/70 |
| 2007/0194978 | A1 * | 8/2007 | Teshirogi et al. | 342/28 |
| 2007/0285307 | A1 * | 12/2007 | Nishijima et al. | 342/200 |
| 2009/0073029 | A1 * | 3/2009 | Nishijima et al. | 342/200 |
| 2009/0256739 | A1 * | 10/2009 | Teshirogi et al. | 342/204 |
| 2010/0194623 | A1 * | 8/2010 | Hansen | 342/52 |
| 2010/0289692 | A1 * | 11/2010 | Winkler | 342/70 |
| 2011/0012774 | A1 * | 1/2011 | Sakai et al. | 342/145 |
| 2011/0260912 | A1 * | 10/2011 | Binzer et al. | 342/175 |
| 2012/0062304 | A1 * | 3/2012 | Bao | 327/355 |
| 2012/0098698 | A1 * | 4/2012 | Reuter | 342/200 |
| 2012/0112956 | A1 * | 5/2012 | Trotta et al. | 342/165 |
| 2012/0182177 | A1 * | 7/2012 | Himmelstoss et al. | 342/173 |

FOREIGN PATENT DOCUMENTS

| | | |
|---|---|---|
| DE | 10 2005 062772 | 7/2007 |
| EP | 0 131 337 | 1/1985 |
| JP | 2008116427 A * | 5/2008 |
| WO | 2006/029926 | 3/2006 |

OTHER PUBLICATIONS

Guan X et al: "Integrated Phased Array Systems in Silicon" Proceedings of the IEEE, IEEE. New York, US, vol. 93, No. 9, Sep. 1, 2005, pp. 1637-1655, XP011137882, ISSN : 0018-9219, p. 1642, right-hand column, paragraph 2—p. 1643, paragraph IV ; figures 1,3,4b.

"Adaptive Fahrgeschwindigkeitsregelung ACC," (ACC Adaptive Cruise Control), Yellow Series, 2002 edition, Technische Unterrichtung, (Technical Instruction).

* cited by examiner

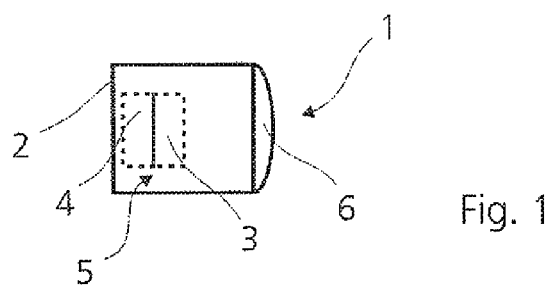
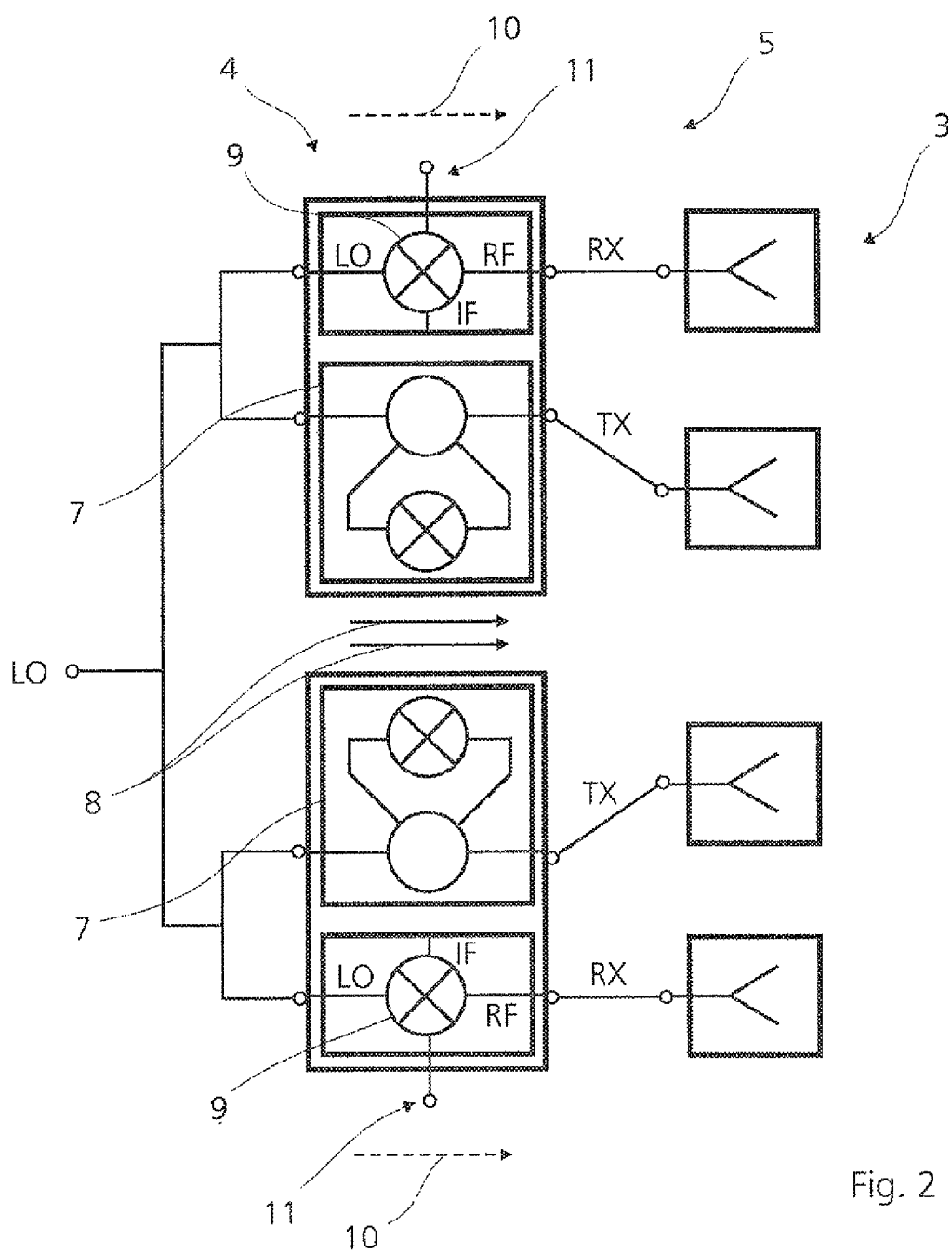
Fig. 2

MONOSTATIC MULTIBEAM RADAR SENSOR DEVICE FOR A MOTOR VEHICLE

FIELD OF THE INVENTION

The present invention relates to a monostatic multibeam radar sensor device for a motor vehicle, including a directional characteristic of an antenna unit having at least one transceiving channel and at least one receiving channel, and including a mixer system, which has an at least approximately isolating mixer for at least one of the receiving channels. The present invention also relates to a Gilbert cell mixer for a monostatic multibeam radar sensor device of this type, as well as to a method for operating a monostatic multibeam radar sensor device of this type.

BACKGROUND INFORMATION

Radar sensors of this type are used, for example, in distance warning and regulating systems in motor vehicles, in particular adaptive cruise control (ACC) systems. Adaptive cruise control systems of this type are described in the publication by Robert Bosch GmbH, "Adaptive Fahrgeschwindigkeitsregelung ACC" (ACC Adaptive Cruise Control), Yellow Series, 2002 edition, Technische Unterrichtung" (Technical Instruction). Radar sensors are also described therein.

In radar sensors having a monostatic antenna concept, the same antenna is used both to transmit the radar signal and to receive the radar echo. Non-isolating mixers or transfer mixers are then used to forward the signal supplied to the antenna via the RF (radio frequency) source port and simultaneously to mix the signal received by the antenna with a portion of the signal supplied via the RF source port. The mixed product is then an intermediate frequency signal whose frequency indicates the frequency difference between the transmitted and received signals. This intermediate frequency signal provides information about the Doppler shift occurring at the radar target upon reflection of the transmitted signal, and thus information about the relative velocity of the radar target and, if the frequency of the transmitted signal is modulated in a ramped manner (FMCW (Frequency Modulated Continuous Wave) radar), information about the propagation time of the radar signal and thus the distance of the radar target as well. A monostatic multibeam radar sensor for motor vehicles, including a mixer system having multiple transfer mixers, is specified in DE 10 2004 044 130 A1.

In system architectures of multibeam radar sensors having four radar beams or radar beam lobes, the generated local oscillator power is supplied to transfer mixers. These transfer mixers typically transmit half of the power, while the other half of the power is used as a reference signal for the semiconductor components, such as diodes or transistors, needed for mixing. However, this typically applies only to the inner radar beam lobes, which form the transceiving channels. In the two outer radar beam lobes, the transmission power may be reduced or eliminated entirely to achieve narrower inner radar beam lobes, which, on the one hand, permits a better angle estimate and, on the other hand, reduces adjacent lane interference. Since the outer radar beam lobes are receive-only channels, isolating mixers are assigned to them.

SUMMARY OF THE INVENTION

The monostatic multibeam radar sensor device according to the present invention for a motor vehicle, including a directional characteristic of an antenna unit having at least one transceiving channel and at least one receiving channel, and including a mixer system, which has an at least approximately isolating mixer for at least one of the receiving channels, the at least approximately isolating mixer including a Gilbert cell mixer which, due to a non-ideal isolation of, in particular, its mixer cell, between an input of a local oscillator signal or a local oscillator signal feed and the corresponding receiving channel, emits a transmission power via this receiving channel, using an overcoupling signal, the transmission power influencing the directional characteristic of the antenna unit and the directional characteristic being switchable by controlling the phase position of the overcoupling signal; the monostatic multibeam radar sensor device has the advantage that a switchable directional characteristic or a switchable transmission sum pattern is created. This makes it possible to operate a multibeam radar sensor device having, in particular, two different states which are characterized by transmission sum patterns of different widths. Due to this switching operation, additional information may be obtained which may substantially improve the performance of the participating systems. The switching operation makes it possible to mask out or confirm objects at different angular deviations. In particular, this method appears to be effective within an angle range between 4° and 8°, since significant amplitude differences in the aperture illumination may be expected therein, due to the transmission sum pattern. This may potentially broaden the angle estimation range.

By using a Gilbert cell mixer or a Gilbert cell as the mixer cell in the isolating mixer, it is possible to form the transmission sum pattern accordingly. Gilbert cell architectures are known, for example, from DE 102 39 856 A1 and may be used to implement transistor-based (rather than diode-based) mixers and thus to achieve an additional conversion gain.

The special feature of a Gilbert cell mixer of this type is, among other things, that an infinitely high degree of isolation may be achieved between the local oscillator signal input and the receiving channel when using ideally identical switching transistor pairs. In the multibeam radar sensor device, this would mean that no supplied local oscillator power could be emitted by the receiving channels, in particular the outer radar beam lobes. In practice, however, only a finite degree of synchronization between all transistors is achievable under real implementation conditions, in particular at frequencies in the range of 77 Gigahertz. Slight fluctuations in the current amplification result in a significant loss of isolation. In the system, this is expressed by the fact that the outer radar beam lobes nevertheless emit at lower power with regard to the amplitude. They therefore contribute to the directional diagram of the multibeam radar sensor device. Due to the mixer cell's non-ideal isolation between the input of the local oscillator signal and the corresponding receiving channel, a transmission power is emitted by the overcoupling signal or leakage signal. Correspondingly, the phase position of all four radar beams must also be identical to obtain a usable transmission sum pattern. In reality, it was actually possible to achieve a relative decrease of only approximately 10 db from the outer radar beams to the inner radar beams. A significant problem arose with regard to the phase. The switching transistor pairs have the characteristic that an asymmetry in the leakage signal phase between the local oscillator and the receiving channel is expressed in a phase position of either 0° or 180°. Depending on which differential branch of the circuit generates less amplification, the leakage signal phase shifts toward one or the other phase position, each shifted by 180°. It was therefore possible for the directional diagram to be random, a waste of approximately 50% having to be taken into account, since this shift was not previously controllable. The multibeam radar sensor device according to the present invention advantageously provides a switchable directional characteristic by systematically controlling the phase position of the overcoupling signal. The phase position of the overcoupling signal may be switchable between 0° and 180°.

In a very advantageous embodiment of the present invention, the switching transistor pairs of the Gilbert cell mixer may be fed separately via separate power sources. To control the phase position of the overcoupling signal, the separate power sources selectively provide asymmetrical supply currents, which have a corresponding current difference in relation to each other.

The inability to control the shift in the phase position of the overcoupling signal may be counteracted as follows. Instead of accepting manufacturing-related differences in the current amplification of the transistors, this parameter may be selectively influenced. Up to now, both differential switching transistor pairs were supplied via a common power source. Dividing the power source into two power sources for the individual switching transistor pairs makes it possible to influence the current amplification of the particular switching transistor pairs, which is co-determined by the injected current. Using a corresponding mimicry and an outer control pin, it is advantageously possible to selectively asymmetrize the current in the two branches. This makes it possible to control a shift in the phase toward 0° or 180°. It must only be ensured that the current difference in the branches is great enough to mask out manufacturing fluctuations.

Also described is a Gilbert cell mixer for a monostatic multibeam radar sensor device.

Also described is a method for operating a monostatic multibeam radar sensor device for a motor vehicle.

Exemplary embodiments and/or exemplary methods of the present invention are described schematically below on the basis of the drawings.

BRIEF DESCRIPTION OF THE DRAWINGS

FIG. 1 shows a schematic diagram of a multibeam radar sensor device according to the present invention.

FIG. 2 shows a simplified block diagram of a receiver architecture of the multibeam radar sensor device according to the present invention.

DETAILED DESCRIPTION

Figure 3:
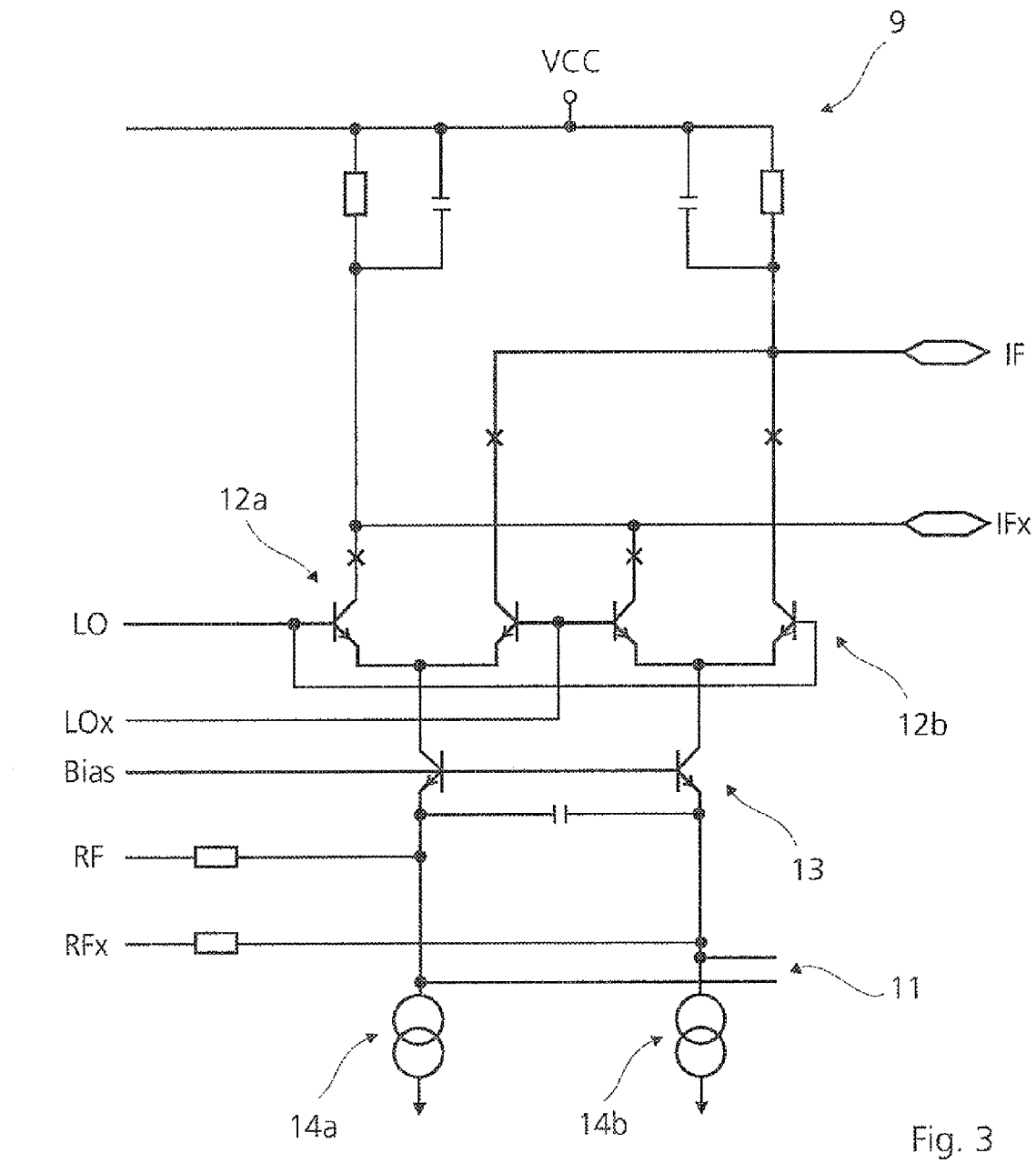
FIG. 3 shows a schematic circuit diagram of a modified Gilbert cell mixer for the multibeam radar sensor device according to the present invention.

FIG. 1 shows a monostatic multibeam radar sensor device 1 according to the present invention for a motor vehicle (not illustrated), including a housing 2. Housing 2 includes an antenna unit 3 and a mixer system 4, which form a receiver architecture 5 of multibeam radar sensor device 1 according to the present invention, including transceiving channels TX and receiving channels RX (see FIG. 2). A beam forming element designed as a lens 6 is also provided.

Figure 4:
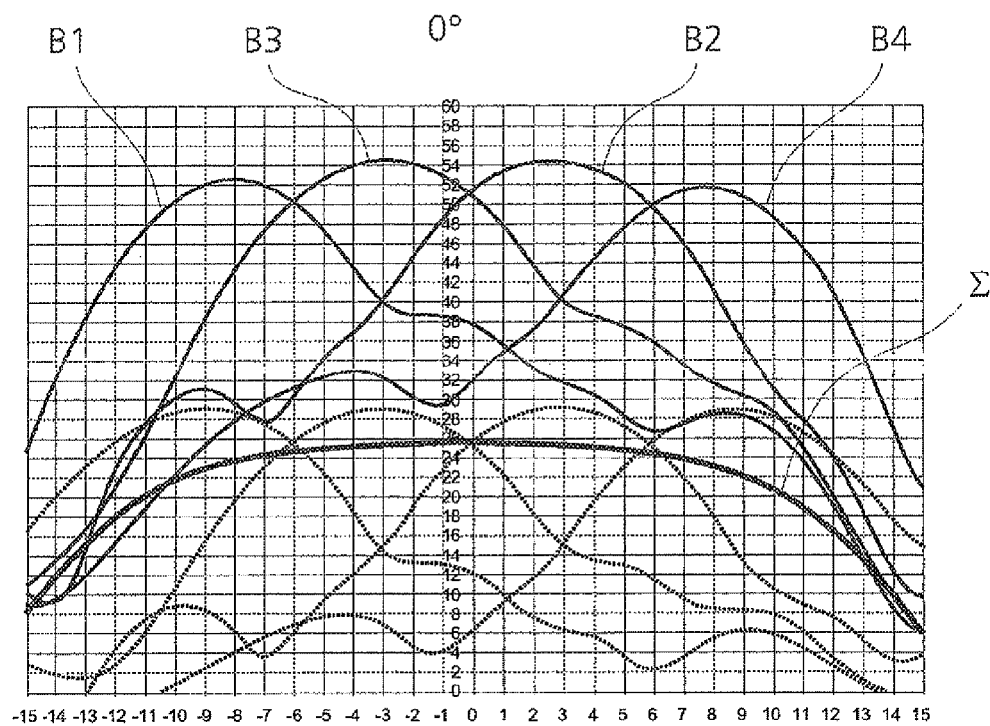
FIG. 4 shows a simplified horizontal directional diagram of the multibeam radar sensor device according to the present invention in a first state.
Figure 5:
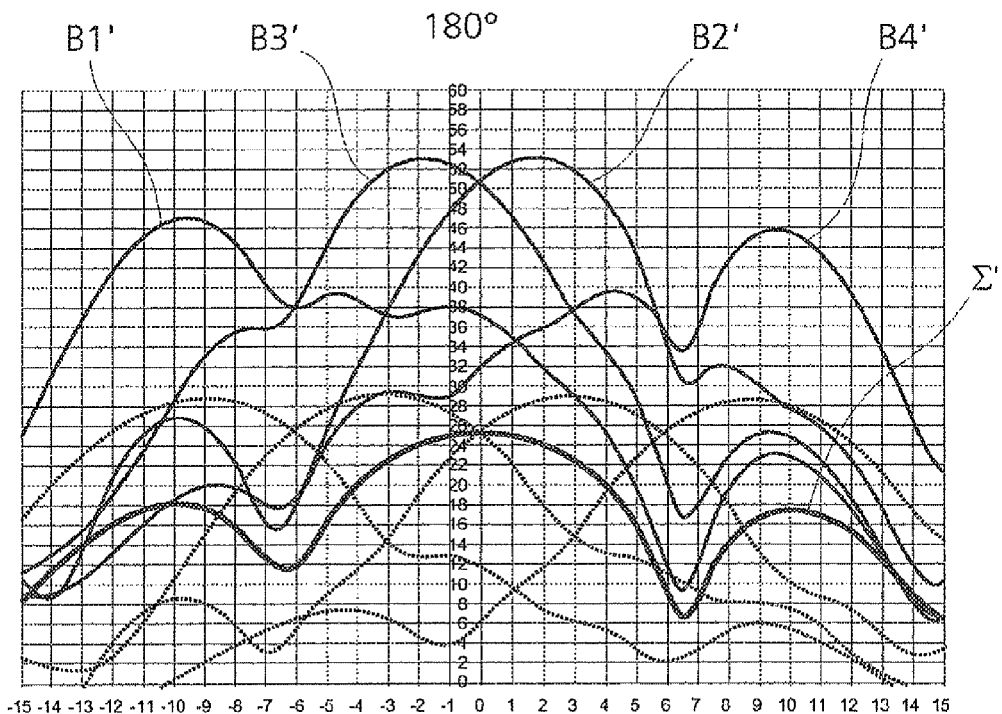
FIG. 5 shows a simplified horizontal directional diagram of the multibeam radar sensor device according to the present invention in a second state.

Transceiving channels TX and receiving channels RX of multibeam radar sensor device 1 result in a directional characteristic of multibeam radar sensor device 1, including radar beams or radar beam lobes B1, B1' through B4, B4', which add up to corresponding transmission sum patterns Σ, Σ' (see FIGS. 4 and 5).

FIG. 2 shows receiver architecture 5 in greater detail, including antenna unit 3 and mixer system 4. A local oscillator signal LO is supplied via an input or a local oscillator supply. Transfer mixer units or transfer coupler units 7 of mixer system 4 are assigned to the two transceiving channels TX. A selectively set transmission power (indicated by arrows 8 in FIG. 2) is thus emitted via transceiving channels TX, using middle or inner radar beam lobes B2, B2', B3, B3'. Transfer mixer units or transfer coupler units 7 are sufficiently well known and are therefore not discussed in greater detail below.

As further shown in FIG. 2, mixer system 4 is provided with an at least approximately isolating mixer for each of the two receiving channels RX which generate outer radar beam lobes B1, B1', B4, B4', the at least approximately isolating mixer including a Gilbert cell mixer 9 having a mixer cell, which is illustrated in further detail in FIG. 3. Due to a non-ideal isolation, in particular of its mixer cell, between the input of local oscillator signal LO and corresponding receiving channel RX, Gilbert cell mixer 9 emits, via receiving channel RX, a transmission power or residual transmission power via an overcoupling signal having a transmission power of approximately −20 dB (indicated by arrows 10), the transmission power or residual transmission power substantially influencing the directional characteristic or directional diagram of antenna unit 3 (outer radar beam lobes B1, B1', B4, B4'). Due to the lack of loss in transfer mixer units or transfer coupler units 7, this additionally results in an approximately 5 dB better conversion of outer receiving channels RX. Gilbert cell mixer 9 receives local oscillator signal LO as the input signal. A radio frequency signal RF is supplied on the antenna side. In addition, an intermediate frequency signal IF may be tapped.

In multibeam radar sensor device 1 according to the present invention, the directional characteristic may be switched by controlling the phase position of overcoupling signal 10 of Gilbert cell mixer 9, the phase position of overcoupling signal 10 being switchable between 0° and 180°. The switching operation or the control thereof takes place via control inputs or switching ports 11.

FIG. 3 shows a circuit diagram of a modified Gilbert cell mixer 9 for multibeam radar sensor device 1 according to the present invention. Local oscillator signal LO or LOx is differentially supplied to upper switching transistor pairs 12a, 12b. Radio frequency signal RF, RFx is differentially supplied to lower transistor pair 13. Intermediate frequency signal IF, IFx may be differentially tapped at the upper resistors. A voltage supply system VCC and a bias are also provided. Switching transistor pairs 12a, 12b of Gilbert cell mixer 9 are each supplied separately by a separate power source 14a, 14b. To control the phase position of overcoupling signal 10, the separate power sources 14a, 14b selectively provide asymmetrical supply currents, which have a corresponding current difference in relation to each other. This is controlled via switching port 11. This makes it possible to control a shift in the phase toward 0° or 180°. It must only be ensured that the current difference in the branches is great enough to mask out manufacturing fluctuations.

Gilbert cell mixer 9 may be designed, in particular, as a dual-balanced MMIC (monolithic microwave integrated circuit) mixer. Transmission sum pattern Σ, Σ' is formed and provided with a switchable design by using modified Gilbert cell mixer 9. The relative transmission power of Gilbert cell mixer 9 is switchable in the phase between 0° and 180°. The approximately loss-free implementation of this functionality is very advantageous, with no interventions being made into the existing mixer architecture.

A method for operating monostatic multibeam radar sensor device 1 for a motor vehicle may thus be carried out, the directional characteristic, in particular transmission sum pattern Σ, Σ' of multibeam radar sensor device 1, being switched between two states to obtain additional information. The states are switched by controlled switching of the phase position of overcoupling signal 10 between 0° and 180° by selectively controlling the supply currents provided by particular separate power sources 14a, 14b of switching transistor pairs 12a, 12b.

As shown in FIGS. 4 and 5, this functionality thus makes it possible to switch the phase of outer radar beam lobes B1, B1', B4, B4' between 0° and 180°. In the 0° case illustrated in FIG. 4, a transmission sum pattern Σ having a typical main beam of ±8.5° in width (3 dB) is generated if it is also ensured that phase balance prevails at antenna unit 3 at all transceiving channels TX or radar beam lobes B2, B3 and receiving channels RX or radar beam lobes B1, B4. Transceiving beams or radar beam lobes B1 through B4 are superimposed on each other in a phase-synchronous manner.

Curves B1, B' through B4, B4' represent two-way beams. The corresponding one-way beams are indicated by dotted lines.

In the 180° case illustrated in FIG. 5, a destructive superimposition by outer radar beam lobes B1', B4', which add up to a phase-shifted 180°, results at the outer edges of middle radar beam lobes B2', B3'. This results in substantial narrowing (±3°) of the main beam in transmission sum pattern Σ'. Due to the 180° phase position, additional side lobes continue to be produced in the outer areas of the detection field.

The switching operation makes it possible to mask out or confirm objects at different angular deviations. In particular, this method is effective within an angle range between 4° and 8°, since significant amplitude differences in the aperture illumination may be expected therein, due to transmission sum pattern Σ, Σ'. This may potentially broaden the angle estimation range.

What is claimed is:

1. A monostatic multibeam radar sensor device for a motor vehicle, comprising:
   a directional characteristic of an antenna unit having at least one transceiving channel (TX) and at least one receiving channel (RX);
   a mixer system, which includes at least an approximately isolating mixer for at least one of the receiving channels (RX), wherein the at least approximately isolating mixer includes a Gilbert cell mixer, which, due to an non-ideal isolation between an input of the local oscillator signal (LO) and the corresponding receiving channel (RX), emits a transmission power via this receiving channel, using an overcoupling signal, wherein the transmission power influences the directional characteristic of the antenna unit, and wherein the directional characteristic is switchable by controlling the phase position of the overcoupling signal.

2. The multibeam radar sensor device of claim 1, wherein the phase position of the overcoupling signal is switchable between 0° and 180°.

3. The multibeam radar sensor device of claim 1, wherein the switching transistor pairs of the Gilbert cell mixer are each supplied separately by a separate power source.

4. The multibeam radar sensor device of claim 1, wherein the separate power sources selectively provide asymmetrical supply currents, which have a corresponding current difference in relation to each other, for controlling the phase position of the overcoupling signal.

5. The multibeam radar sensor device of claim 1, further comprising:
   switching transistor pairs, each of which is supplied by a separate power source.

6. A method for operating a monostatic multibeam radar sensor device for a motor vehicle, the method comprising:
   switching a directional characteristic, which is a transmission sum pattern (Σ, Σ') of the multibeam radar sensor device, between two states to obtain additional information;
   wherein the monostatic multibeam radar sensor device for a motor vehicle includes:
      the directional characteristic of an antenna unit, which has at least one transceiving channel (TX) and at least one receiving channel (RX);
      a mixer system, which includes at least an approximately isolating mixer for at least one of the receiving channels (RX), wherein the at least approximately isolating mixer includes a Gilbert cell mixer, which, due to an non-ideal isolation between an input of the local oscillator signal (LO) and the corresponding receiving channel (RX), emits a transmission power via this receiving channel, using an overcoupling signal, wherein the transmission power influences the directional characteristic of the antenna unit, and wherein the directional characteristic is switchable by controlling the phase position of the overcoupling signal.

7. The method of claim 6, wherein the states are switched by controlled switching of the phase position of the overcoupling signal between 0° and 180° by selectively controlling the supply currents provided by the particular separate power sources of the switching transistor pairs.

* * * * *

UNITED STATES PATENT AND TRADEMARK OFFICE
CERTIFICATE OF CORRECTION

PATENT NO. : 8,441,397 B2  Page 1 of 1
APPLICATION NO. : 12/812528
DATED : May 14, 2013
INVENTOR(S) : Binzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this
Eighth Day of September, 2015

Michelle K. Lee
*Director of the United States Patent and Trademark Office*